United States Patent Office 3,813,432
Patented May 28, 1974

3,813,432
SUBSTITUTED 1-HYDROXY CYCLOPROPANE-1-CARBOXYLIC ACIDS
Hans-Georg Heine, Hans-Michael Fischler, and Willy Hartmann, Krefeld, Germany, assignors to Bayer Aktiengesellschaft, Leverkusen, Germany
No Drawing. Filed June 2, 1972, Ser. No. 258,967
Claims priority, application Germany, June 8, 1971,
P 21 28 327.2
Int. Cl. C07c 61/04
U.S. Cl. 260—514 H   11 Claims

ABSTRACT OF THE DISCLOSURE 1-hydroxy cyclopropane-1-carboxylic acids are prepared by treating compounds having the formula

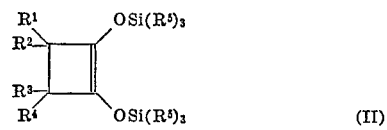

with chlorine and/or bromine at a temperature of below $+30°$ C., thereafter adding a protic solvent to the reaction mixture and isolating the cyclopropane compound. Certain substituted 1-hydroxy cyclopropane-1-carboxylic acids are also disclosed.

BACKGROUND

This invention relates to a process for the preparation of 1-hydroxy cyclopropane-1-carboxylic acids.

Hitherto, only a few examples of cyclopropane derivatives which carry geminally both a hydroxyl and a carboxyl substituent have been known. Thus, Scharf (Angew. Chemie 80, 194 (1968) has prepared 1-hydroxy cyclopropane-1-carboxylic acid by hydrolysing 3a,5a-dichlor-3a,4,5,5a-tetrahydrocyclobuta[d][1.3]dioxol - 2 - on obtained by the photo-cycloaddition of dichlorovinylene carbonate and ethylene. Bloomfield (Tetrahedron Letters 1968, 5647) has also prepared tricyclo[4.4.1.0¹·⁶] undeca-3.8-dien-11-hydroxy-11-carbon acid from tricyclo

[4.4.2.0¹·⁶]

dodeca-3.8-dien-11.12-dion by a benzilic acid rearrangement. Two photoreactions are necessay in the process described by Scharf, the photocycloaddition reaction giving a quantum yield ≪1 in each case, whereas acyloin and diketone, two highly reactive substantially unstable compounds, are involved in the process described by Bloomfield. Accordingly, both processes are as unsuitable for the production of preparative quantities of 1-hydroxy cyclopropane-1-carboxylic acids as the method which has already been adopted by Ingold in which cyclopropane-1,1-dicarboxylic acid esters are converted into 1-hydroxy cyclopropane-1-carboxylic acid (J. Chem. Soc. 121, 1177 (1922) by a multi-stage synthesis.

An unsuccessful attempt to obtain 1-hydroxy cyclopropane-1-carboxylic acid by hydrolysing 1-chloro-cyclopropane - 1 - carboxylic acid has also been described (Bull. Acad. Roy. Belg. 1921, 7021).

SUMMARY

It has now surprisingly been found that high yields of 1-hydroxy cyclopropane-1-carboxylic acid can readily be obtained if 1,2 - bis-(trimethylsiloxy)-cyclobut-1-ene, which can readily be obtained from esters of succinic acid according to Ruhlmann (Chem. Ber. 100, 3821 (1967), Tetrahedron Letters 1968, 587), is chlorinated, brominated or reacted with a mixture of chlorine and bromine, at temperatures of from −30 to −50° C., followed by the addition of protic solvents, such as water or methanol.

The reaction which leads to 1-hydroxy cyclopropane-1-carboxylic acid without any complications is unexpected in view of Ruhlmann's experimental results (J. Prak. Chem. 12, 18 (1960), according to which α,α'-dibromo-1,2-diketones are formed as the sole reaction products in the reactions of acyclic enediol-bis-silyl ethers with bromine.

This reaction sequence can also be applied to substituted cyclobut-1-ene-1,2-diol-bis-silyl ethers, and can be applied generally, for the preparation of the substituted 1-hydroxy cyclopropane-1-carboxylic acids listed below.

Accordingly, the invention relates to a process for the preparation of 1-hydroxy cyclopropane-1-carboxylic acids having the general formula:

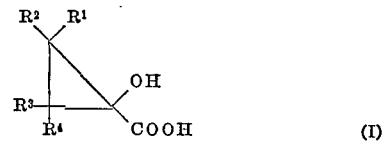

in which $R^1$ to $R^4$ are the same or different and each represents a hydrogen atom, a lower alkyl group with from 1 to about 6 carbon atoms, or a cycloalkyl, alkenyl or aralkyl group; or $R^1$ is attached to $R^2$ and/or $R^3$ is attached to $R^4$, or $R^1$ is attached to $R^3$ and/or $R^2$ is attached to $R^4$, to complete a polymethylene chain, which is optionally substituted by hetero atoms, and which may also be a part of a 5-membered or 6-membered ring, in which compounds of the general formula:

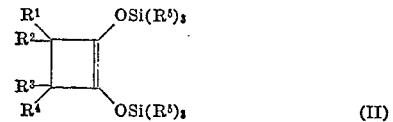

in which $R^1$ to $R^4$ have the same meaning as in formula (I); and $R^5$ represents a lower alkyl group or a phenyl group, are halogenated with chlorine and/or bromine at temperatures below $+30°$ C., preferably at temperatures of from $+10°$ C. to $-70°$ C., optionally in the presence of aprotic solvents, and protic solvents are subsequently added.

DESCRIPTION

The following represent preferred radicals for $R^1$ to $R^4$:

Linear or branched alkyl radicals with from 1 to 6 carbon atoms, more particularly with from 1 to 4 carbon atoms; cycloalkyl radicals with 5 or 6 carbon atoms in the ring which may also be substituted by lower alkyl radicals, preferably with from 1 to 3 carbon atoms; aralkyl radicals with up to 16 carbon atoms, preferably those with from 1 to 4 carbon atoms in the aliphatic chain, and with the phenyl radical as the aromatic portion, and more particularly the benzyl and phenylethyl radical. If two of the radicals $R^1$ to $R^4$ are attached to form a polymethylene chain, this chain preferably contains from 2 to 8 and more particularly 3 or 4 methylene groups.

Thus, it is possible to use for example the following cyclobutene derivatives which can be prepared according to the method of Ruhlmann:

1,2-bis-(triethylsiloxy)-cyclobut-1-ene;
1,2-bis-(triphenylsiloxy)-cyclobut-1-ene;
1,2-bis-(trimethylsiloxy)-cyclobut-1-ene;
1,2-bis-(trimethylsiloxy)-3-methyl cyclobut-1-ene;
1,2-bis-(trimethylsiloxy)-3-isopropyl cyclobut-1-ene;
1,2-bis-(trimethylsiloxy)-3,3-dimethyl-cyclobut-1-ene;

1,2-bis-(trimethylsiloxy)-3,3,4,4-tetramethyl-cyclobut-1-ene;
1,2-bis-(trimethylsiloxy)-3-ethyl-cyclobut-1-ene;
Spiro-2,3'-adamantane-1',2'-bis-(trimethylsiloxy)-cyclobut-1'-ene;
6,7-bis-(trimethylsiloxy)-bicyclo(3,2,0)hept-7-ene;
7,8-bis-(trimethylsiloxy)-bicyclo(4,2,0)oct-7-ene; and
3-cholestanyl-1,2-bis-(trimethylsiloxy)-cyclobut-1-ene.

Examples of aprotic solvents suitable for use in the halogenation stage include methyl chloride, methylene chloride, chloroform, carbon tetrachloride, pentane, hexane, benzene, formic acid and esters of acetic acid.

In addition to water and methanol, suitable protic solvents include other alcohols and acetic acid. Mixtures of the aforementioned protic solvents may, of course, also be used.

In carrying out the process, the cyclobutene derivative which is to be reacted is halogenated using chlorine and/or bromine at temperatures below $+30°$ C. and preferably at temperatures between $+10°$ C. and $-70°$ C. with stirring, optionally in one of the aforementioned aprotic solvents or in substance (without solvents), and a protic solvent, preferably water or a lower alcohols, is then added.

The reaction time is generally from 1 hour to about 10 hours, the halogenation stage generally requiring only a short reaction time ranging from a few minutes to about 1 hour, more particularly from 15 to 30 minutes, as is known per se. With relatively large batches, it may take longer depending upon the particular conditions prevailing. The second reaction stage between the halogenated cyclobutene derivative and the protic solvent generally takes longer, for example from about 2 to 6 hours.

The hydroxy cyclopropane carboxylic acids obtained in accordance with the invention may be purified by conversion into their salts as is known per se.

Accordingly, an alkali or alkaline earth metal hydroxide oxide or salt of a weak acid, for example sodium or potassium hydroxide, carbonate or hydrogen carbonate, is generally added to the protic solvent in a sufficient quantity to cause formation of the salt. It may presumably alternatively be added later by separating off the organic phase in cases where the protic solvent is water, or by extracting the reaction mixture with a suitable immiscible solvent, the neutral secondary products formed during the reaction may be removed. Thereafter the resulting, for example aqueous, solution of the hydroxy cyclopropane carboxylic acid salt is acidified, for example with a dilute aqueous mineral acid, and the hydroxy cyclopropane carboxylic acid recovered, for example by extraction with ether. Broadly speaking, the hydroxy cyclopropane carboxylic acid obtained in accordance with the invention can be separated off from the reaction mixture by methods with which any skilled technican will be familiar.

The 1-hydroxy cyclopropane-1-carboxylic acids of formula (I) according to the invention are new where $R^1$ to $R^4$ do not represent H.

Accordingly the invention also relates to 1-hydroxy cyclopropane-1-carboxylic acids of formula (I) in which $R^1$ to $R^3$ are the same or different and each represents a hydrogen atom, a lower alkyl group with from 1 to about 6 carbon atoms, or a cycloalkyl, alkenyl or aralkyl group, and $R^4$ represents a lower alkyl group with from 1 to about 6 carbon atoms; or
$R^1$ is attached to $R^2$ and/or $R^3$ is attached to $R^4$, or
$R^1$ is attached to $R^3$ or $R^2$ is attached to $^4$ to form a polymethylene chain, which is optionally substituted by hetero atoms, and which may be a part of a 5- or 6- membered ring.

The 1-hydroxy cyclopropane-1-carboxylic acids which can be readily obtained by the process according to the invention are valuable intermediates and can be used for example in the production of plant-protection agents for example as: cf. French Pat. No. 1,399,615 and U.S. Pat. No. 3,277,171.

In the following Examples, temperatures are given in °C., whilst the term melting point is represented by its abbreviation M.P.

EXAMPLE 1

32 g. (0.2 mol) of bromine in 50 ml. of iso-pentane are added with stirring to 46 g. (0.2 mol) of 1,2-bis-(trimethylsiloxy)cyclobut-1-ene over a period of 15 minutes at $-40°$ C. Thereafter, the reaction mixture is stirred into an ice-cold 5% aqueous sodium hydroxide solution. After this has been stirred for 2 hours, the neutral products are extracted with ether. The alkaline aqueous phase is then acidified with dilute hydrochloric acid and the 1-hydroxy cyclopropane-1-carboxylic acid is subsequently extracted with ether.

Yield: 18.3 g. (90%), colourless crystals, which melt at 105–107° C. (from xylene).

$C_4H_6O_3$ (102.1).—Calculated: C, 47.1; H, 5.9%. Found: C, 47.1; H, 5.8%.

EXAMPLE 2

300 ml. of 2 N KOH are added with stirring and external cooling to the colourless solution obtained by reacting 46 g. (0.2 mol) of 1,2-bis-(trimethylsiloxy)-cyclobut-1-ene in 100 ml. of carbon tetrachloride with 32 g. (0.2 mol) of bromine in 50 ml. of carbon tetrachloride at a temperature of 10° C. After 6 hours, neutral products are separated off as described in Example 1. Acidification and extraction with ether give 17.6 g. (86%) of 1-hydroxy cyclopropane-1-carboxylic acid, which melts at 106–109° C.

EXAMPLE 3

10 ml. of chlorine are introduced with stirring into a solution of 46 g. (0.2 mol) of 1,2-bis-(trimethylsiloxy)-cyclobut-1-ene in 100 ml. of methylene chloride over a period of 30 minutes at $-30°$ C. Thereafter, the reaction mixture is slowly added dropwise to a suspension of 70 g. of soda in 300 ml. of water while cooling. After stirring for 4 hours at room temperature, the 1-hydroxy cyclopropane-1-carboxylic acid is separated off as described in Example 1.

Yield: 15.1 g. (74%), M.P. 103–106° C.

EXAMPLE 4

A solution of 28.6 g. (0.1 mol) of 1,2-bis-(trimethylsiloxy)-3,3,4,4-tetramethyl cyclobut-1-ene in 50 ml. of methylene chloride, to which 16 g. (0.1 mol) of bromine have been added at $-40°$ C., is poured into a saturated aqueous sodium bicarbonate solution while cooling. Working up as described in Example 1 gives 12.8 g. (81%) of 1-hydroxy-2,2,3,3-tetramethyl cyclopropane-1-carboxylic acid which melts at 123–125° C. (from n-hexane/ether).

$C_8H_{14}O_3$ (158.2).—Calculated: C, 60.7; H, 8.9%. Found: C, 60.6; H, 9.0%.

EXAMPLE 5

43 g. (0.17 mol) of 1,2-bis-(trimethylsiloxy)-3-methyl cyclobut-1-ene are brominated in 60 ml. of methyl acetate with 27 g. (0.17 mol) of bromine in 50 ml. of methylene chloride at a temperature of $-20°$ C. The solution obtained is poured into 400 ml. of 5% aqueous sodium hydroxide solution and worked up as described in Example 1 to give 19.4 g. (100%) of 1-hydroxy-2-methyl cyclopropane-1-carboxylic acid, which melts at 64–66° C. (from xylene).

$C_5H_8O_3$ (116.1).—Calculated: C, 51.7; H, 6.9%. Found: C, 51.6; H, 6.8%.

EXAMPLE 6

56.8 g. (0.2 mol) of 7,8-bis-(trimethylsiloxy)-bicyclo-(4,2,0)-oct-7-ene are brominated in 100 ml. of iso-pentane with 32 g. (0.2 mol) of bromine in 20 ml. of methylene chloride at a temperature of −50° C. The solution obtained is poured into 200 ml. of 10% aqueous sodium hydroxide solution and worked up as described in Example 1 to give 23.7 g. (76%) of 7-hydroxybicyclo(4,1,0) heptano-7-carboxylic acid, melting at 126–127° C. (from n-hexane/ether).

$C_8H_{12}O_3$ (156.2).—Calculated: C, 61.5; H, 7.8%. Found: C, 61.5; H, 7.9%.

EXAMPLE 7

The reaction of 54.5 g. (0.2 mol) of 3 iso-propyl-1,2-bis(trimethylsiloxy)-cyclobut-1-ene in 50 ml. of methylene chloride with 32 g. (0.2 mol) of bromine in 50 ml. of methylene chloride at a temperature of −40° C. gives 24.9 g. (86.5%) of 1-hydroxy-2-iso-propyl cyclopropane-1-carboxylic acid, which melts at 142–144° C. (from ether/n-hexane) after stirring for 3 hours followed by working up as described in Example 1.

$C_7H_{12}O_3$ (144.2).—Calculated: C, 58.3; H, 8.4%. Found: C, 58.6; H, 8.6%.

EXAMPLE 8

160 g. (1 mol) of bromine in 250 ml. of methylene chloride are added dropwise to 230 g. (1 mol) of 1,2-bis-(trimethylsiloxy)-cyclobut-1-ene in 250 ml. of methylene chloride at −10° C. Thereafter, the reaction mixture is poured onto 1 kg. of ice. After stirring for 15 hours at 25° C., the aqueous solution is concentrated in vacuo to one third of its volume and extracted with ether. Yield: 92 g. (90%) of 1-hydroxy cyclopropane-1-carboxylic acid, which melts at 106–108° C.

In addition, the following compounds were prepared by the process according to the invention in the way described in the preceding Examples:

1-hydroxy-2,2-dimethyl cyclopropane-1-carboxylic acid, M.P. 89–90° C.;
1-hydroxy-2-ethyl cyclopropane-1-carboxylic acid, M.P. 87–88° C.;
1-hydroxy-2-tert.-butyl cyclopropane-1-carboxylic acid, M.P. 112–114° C.

What is claimed is:

1. Process for preparing compounds having the formula:

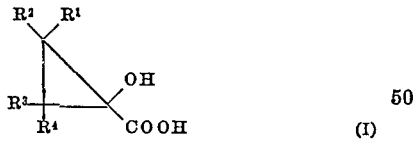

wherein
$R^1$, $R^2$, $R^3$ and $R^4$ are the same or different and each is selected from the group of hydrogen, alkyl, and cycloalkyl, or $R^1$ together with $R^2$ and/or $R^3$ together with $R^4$, or $R^1$ together with $R^3$ and/or $R^2$ together with $R^4$, form a poly methylene chain,
which comprises treating compounds having the formula

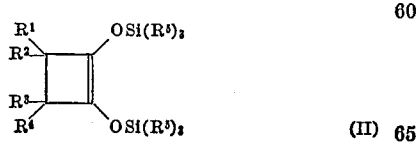

wherein
$R^1$, $R^2$, $R^3$ and $R^4$ have the same meanings as given above, and
$R^5$ is lower alkyl or phenyl,
with chlorine and/or bromine at a temperature of below +30° C., thereafter adding a protic solvent to the reaction mixture and isolating the formula (I) compounds.

2. Process of claim 1 wherein the formula (I) compound is converted to its salt and isolated in this form.

3. Process of claim 1 wherein $R^5$ is selected from the group of methyl, ethyl and phenyl.

4. Process of claim 1 wherein the methylene chain forms a part of a 5- or 6-membered ring.

5. Process of claim 1 wherein the formula (II) compound is reacted with chlorine and/or bromine at a temperature of from +10° C. to −70° C.

6. Process of claim 1 wherein the formula (II) compound is reacted with chlorine and/or bromine in the presence of an aprotic solvent.

7. Process of claim 1 wherein which the protic solvent is selected from the group of water, an aliphatic alcohol, and a formic or acetic acid or a mixture thereof.

8. Process of claim 2 wherein the formula (I) compound is converted to its salt with a base selected from the group of alkali metal hydroxides, alkaline earth hydroxides, alkali metal carbonates and hydrogen carbonate.

9. Process of claim 8 wherein said base is selected from the group of sodium and potassium hydroxides and carbonates.

10. Compounds having the formula

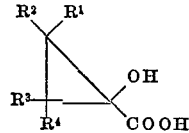

wherein
$R^1$, $R^2$ and $R^3$ are the same or different and each is selected from the group of hydrogen, and lower alkyl; and $R^4$ is lower alkyl or $R^2$ together with $R^4$ form a methylene chain which is part of a 5 or 6 carbon cycloalkyl ring.

11. Compounds of claim 10 selected from the group of 1-hydroxy-2,2,3,3-tetramethyl cyclopropane-1-carboxylic acid;
1-hydroxy-2-methyl cyclopropane-1-carboxylic acid;
7-hydroxy-bicyclo(4,1,0)heptano-7-carboxylic acid;
1-hydroxy-2-iso-propyl cyclopropane-1-carboxylic acid;
1-hydroxy-2,2-dimethyl cyclopropane-1-carboxylic acid;
1-hydroxy-2-ethyl cyclopropane-1-carboxylic acid;
1-hydroxy-2-tert.-butyl cyclopropane-1-carboxylic acid.

References Cited

JACS Vol. 83, pp. 4990–4996 (1961).

LORRAINE A. WEINBERGER, Primary Examiner
P. J. KILLOS, Assistant Examiner

U.S. Cl. X.R.
260—520

UNITED STATES PATENT OFFICE
CERTIFICATE OF CORRECTION

Patent No. 3,813,432               Dated May 28, 1974

Inventor(s) Hans-Georg Heine, et.al.

It is certified that error appears in the above-identified patent and that said Letters Patent are hereby corrected as shown below:

Col. 1, line 46, change "necessay" to necessary

Col. 2, line 27, change "polymethylene" to -- methylene --

Col. 2, line 60, change "polymethylene" to -- methylene --

Col. 3, line 67, change "4" to -- $R^4$ --

Col. 3, line 67, change "polymethylene" to -- methylene --

Col. 5, line 58, change " polymethylene" to -- methylene --

Col. 6, line 19, change "aprotic" to -- aprototic --.

Signed and sealed this 24th day of December 1974.

(SEAL)
Attest:

McCOY M. GIBSON JR.
Attesting Officer

C. MARSHALL DANN
Commissioner of Patents